United States Patent Office 3,632,815
Patented Jan. 4, 1972

3,632,815
1,2,4-THIADIAZOLIUM COMPOUNDS
Gerhard Zumach, Cologne-Stammheim, Hans Holtschmidt, Leverkusen, and Engelbert Kuhle, Bergisch Gladbach, Germany, assignors to Farbenfabriken Bayer Aktiengesellschaft, Leverkusen, Germany
No Drawing. Filed Nov. 20, 1968, Ser. No. 777,481
Claims priority, application Germany, Dec. 8, 1967,
F 54,266
Int. Cl. C07d 91/60
U.S. Cl. 260—302 D    4 Claims

ABSTRACT OF THE DISCLOSURE 1,2,4-thiadiazolium chlorides corresponding to the formula

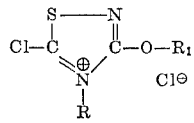

in which R and $R_1$ are hydrocarbon radicals and a process for producing these compounds by reacting isothiocyanates, isocyanates and organic cyanates in the presence of chlorine or chlorine-yielding compounds at temperatures in the range from about 0 to about 100° C.

---

It has been found that salt-like heterocyclic compounds can be obtained by reacting a mixture of an isothiocyanate of the general forumla $$R-(NCS)_x$$

in which R represents an alkyl radical optionally substituted by halogen atoms, a cycloalkyl radical, an aralkyl radical optionally substituted by halogen atoms, or an optionally substituted aryl radical, whilst $x$ represents 1 or 2, and the stoichiometrically necessary quantity of a cyanate, with the stoichiometrically necessary quantity of elementary chlorine or a compound that gives off chlorine, at a temperature in the range from about 0 to about 100° C. and optionally in the presence of an inert organic solvent.

Alkyl radicals with form 1 to 18 carbon atoms are preferred optionally substituted alkyl radicals. Chloride and bromine are preferred halogens, whilst suitable cycloalkyl radicals include in particular those having from 5 to 7 carbon atoms in the ring system. Aralkyl radicals optionally substituted preferred by chlorine or bromine include in particular those which have from 1 to 4 carbon atoms in the aliphatic chain and whose aromatic radical is preferably a phenyl or naphthyl radical. The phenyl or naphthyl radical is preferably used as the optionally substituted aryl radical. Suitable substituents for the aryl radical include halogens (preferably chlorine and bromine), the nitro group, alkyl with from 1 to 12 carbon atoms, halogenoalkyl (preferably lower halogenoalkyl radicals, in particular with chlorine and/or fluorine as halogen, such as trichloromethyl and trifluoromethyl for example), and alkoxy radicals with from 1 to 4 carbon atoms.

The isothiocyanates used in the process according to the invention are known compounds and may be obtained by known processes. The following are examples of such isothiocyanates: methyl isothiocyanate, ethyl isothiocyanate, isopropyl isothiocyanate, n-butyl isothiocyanate, dodecyl isothiocyanate, cyclohexyl isothiocyanate, benzyl isothiocyanate, 2-chloroethylisothiocyanate, tert.-butyl isothiocyanate, phenyl isothiocyanate, 4-chlorophenyl isothiocyanate, 4-trifluoromethylphenyl isothiocyanate, 3-methyl-4-chlorophenyl isothiocyanate, 3-chloro-4-methoxyphenyl isothiocyanate, 1-napthyl isothiocyanate, hexamethylene diisothiocyanate and p-phenylene diisothiocyanate.

The cyanates used in the process according to the invention are known [Berichte 97, 3012, (1964)]. Cyanates corresponding to the general formula $$R_1-OCN$$

in which $R_1$ represents an alkyl radical, optionally substituted by halogen atoms, or an optionally substituted aryl radical, are used in a preferred embodiment of the process according to the invention.

Alkyl radicals with from 1 to 4 carbon atoms are preferred optionally substituted alkyl radicals, whilst chlorine and bromine are preferred halogens. The phenyl radical is preferably used as the optionally substituted aryl radical. The aryl radical may be substituted by nitro groups, halogens (preferably chlorine or bromine), alkyl groups with from 1 to 12 carbon atoms, halogenoalkyl (preferably low halogenoalkyl radicals in particular with chlorine and/or fluorine as halogen such as trichloromethyl and trifluoromethyl for example), alkoxy and alkylmercapto radicals with from 1 to 4 carbon atoms.

The followingn are examples of cyanates: ethyl cyanate, n-propyl cyanate, isopropyl cyanate, n-butyl cyanate, sec.-butyl cyanate, trichloroethyl cyanate, tribromoethyl cyanate, trifluoroethyl cyanate, phenyl cyanate, 4-methylphenyl cyanate, 3,5-dimethylphenyl cyanate, 4-tert-butylphenyl cyanate, 4-isocododecylphenyl cyanate, 3-trifluoromethylphenyl cyanate, 4-trichloromethylphenyl cyanate, 4-chlorophenyl cyanate, 2,4-dichlorophenyl cyanate, 2,4,6-tribromophenyl cyanate, 4-chloro-3-methylphenyl cyanate, 5-chloro-2-methylphenyl cyanate, 3-nitrophenyl cyanate, 4-nitrophenyl cyanate, 4-isoproproxyphenyl cyanate, and 3,5-dimethyl-4-mercaptomethylphenyl cyanate.

The process is illustrated by way of example with reference to the reaction of equivalent quantities of methyl isothiocyanate and trichloroethyl cyanate with chlorine:

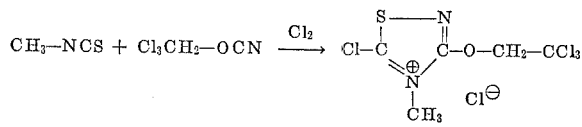

The reactions are usually carried out at temperatures in the range from about 0 to about 100° C., and preferably in the range from 10 to 30° C., optionally in the presence of an inert organic solvent. The reaction products are normally obtained in high yields in the form of hygroscopic compounds that are almost insoluble in organic solvents. Although chlorine is preferably used as the chlorinating agent in the process, it is also possible to use compounds which give off chlorine, for example sulphuryl chloride and phosphorus pentachloride. Suitable inert organic solvents include all those solvents that cannot be chlorinated under the reaction conditions, for example methylene chloride, chloroform, carbon tetrachloride, chlorobenzene or dichlorobenzene.

As a rule, the isothiocyanate is used in such a quantity that, in the case of monofunctional compounds, approximately one equivalent of a cyanate and, in the case of bifunctional compounds, approximately two equivalents of a cyanate are used. The chlorine or chlorine donors is/ are used in such quantities that 1 mol of chlorine is available for each one of the NCS-groups present.

It is extremely surprising that the reaction takes place very definitely on the lines described above because it is known the p-methoxyphenyl cyanate, for example, is readily chlorinated in the cold giving a monochlorinated cyanuric acid tris-ester [Chem. Ber. 100. pages 3737, 3742 (1967)]. It is also known that isothiocyanates, in particular aliphatic isothiocyanates, for example methyl isothiocyanate, readily react with halogen to form insoluble compounds [Liebig's Annalen der Chemie 285, pages 154, 166, 184 (1895)]. It is all the more surprising that the process according to the invention should prove to be so effective in cases where aliphatic isothiocyanates are used.

The 1,2,4-thiadiazolium chlorides that can be obtained by the process according to the invention are valuable intermediate products for the production of plastics auxiliaries and plant protection agents, and may even be directly used as plant protection agents.

More especially, the products have herbicidal properties. Still more especially, they are selective herbicides which may be used to combat weeds in rice cultivations. This property is exemplified by the following pre-emergence test:

Solvent: Water/acetone 100 parts by weight

To produce a suitable preparation of active compound, 1 part by weight of active compound is mixed with the stated amount of solvent to form an emulsion and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterised by the values 0–5, which have the following meaning:

0—no effect
1—slight damage or delay in growth
2—marked damage or inhibition of growth
3—heavy damage and only deficient development or only 50% emerged
4—plants partially destroyed after germination or only 25% emerged
5—plants completely dead or not emerged.

The active compounds, which were used in an amount of 40 kg./hectar and the results obtained can be seen from the following table:

| Compound | Plants treated | | | | |
|---|---|---|---|---|---|
| | Rice | Millet | Wheat | Mustard | Oats |
| 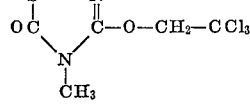 | 0 | 5 | 0 | 1 | 2 |
| 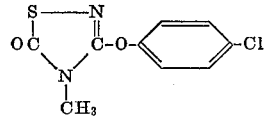 | 0 | 5 | 1 | 2–3 | 1 |

EXAMPLE 1

14 g. (0.2 mol) of chlorine are introduced at 10 to 20° C. into a mxiture of 15 g. of methyl isothiocyanate (0.2 mol) and 35 g. of trichloroethyl cyanate (0.2 mol) in 500 ml. of carbon tetrachloride. A precipitate, which gradually solidifies, is formed during subsequent stirring at room temperature. The temperature rises to 35° C. After some 2 hours when the temperature falls, the reaction mixture is cooled to 0° C., suction filtered from the deposit and washed with ether. 5-chloro-4-methyl-3-(2',2'-2'-trichloroethoxy)-1,2,4-thiadiazolium chloride corresponding to the formula

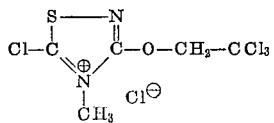

is obtained in the form of colourless, hygroscopic crystals in a yield of 44 g. or 69% of the theoretical. M.P. 112–114° C. (decomposition).

The following compounds are obtained following the procedure described in the preceding example:

| Formula | Melting point, ° C. | Yield in percent |
|---|---|---|
| 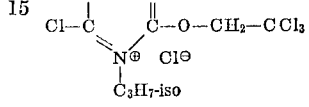 | 102–103 | 62 |
| 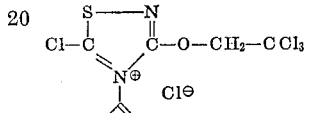 | 54–55 | 61 |
| 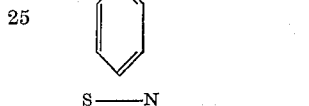 | 62–64 | 57 |
| 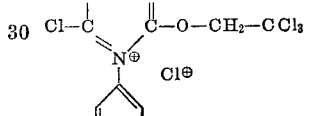 | (¹) | 48 |
| 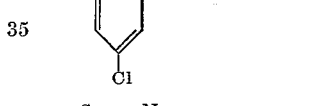 | 182–184 | 31 |
| 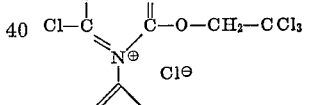 | 126 | 76 |
| 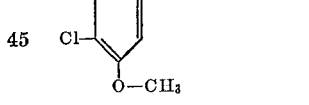 | ² 170–172 | 63 |
| 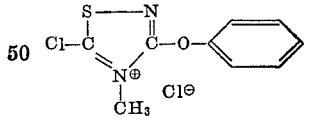 | 133–135 | 43 |
| 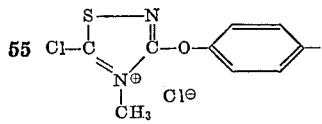 | 68–70 | 58 |

| Formula | Melting point, °C. | Yield in percent |
|---|---|---|
| 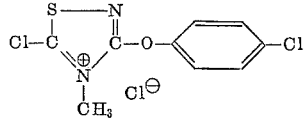 | 136–138 | 65 |
| (structure with CH₃, S-CH₃ substituents) | 130–131 | 55 |
| (structure with C₄H₉, Cl) | (³) | 46 |
| (structure with C₁₂H₂₅, NO₂) | (³) | 51 |
| 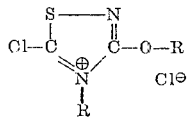 | 36–38 | 32 |
| (structure with cyclohexyl H) | 52–55 | 39 |
| (structure with CH₂-C₆H₅, O-CH₃) | (⁴) | 61 |
| (structure with C₆H₅, Cl) | 42–44 | 64 |
| 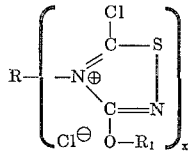 | (⁵) | 25 |

¹ Colourless paste.
² Decomposition.
³ Colourless paste.
⁴ Yellow paste.
⁵ Yellow oil.

EXAMPLE 2

40.5 g. of sulphuryl chloride (0.3 mol) is added dropwise at 10 to 20° C. to a mixture of 22 g. of methyl isothiocyanate (0.3 mol) and 46 g. of p-chlorophenyl cyanate (0.3 mol) in 600 ml. of carbon tetrachloride. Following the dropwise addition, the mixture is stirred for 2 hours at room temperature, and the product which is precipitated is suction filtered and washed with ether. 5-chloro-4-methyl-3-(p-chlorophenoxy) - 1,2,4 - thiadiazolium chloride corresponding to the formula $$Cl-C \overset{S-N}{\underset{N^{\oplus}}{\Vert}} C-O-\!\!\!\left\langle\;\right\rangle\!\!\!-Cl \quad Cl^{\ominus}$$
$$\overset{|}{CH_3}$$

is obtained in the form of colourless hygroscopic crystals in a yield of 65 g. or 73% of the theoretical. M.P. 149–151° C.

What is claimed is:

1. 1,2,4-thiadiazolium chlorides corresponding to the formula $$Cl-C\overset{S-N}{\underset{N^{\oplus}}{\Vert}}C-O-R \quad Cl^{\ominus}$$
$$\overset{|}{R}$$

in which R is selected from the group consisting of $C_{1-18}$ alkyl substituted with the corresponding 5-chloro-3-($R_1$)-oxy-1,2,4-thiaimidazol-4-yl-inium chloride radical, halo-substituted $C_{1-18}$ alkyl, cycloalkyl having 5–7 ring carbon atoms, aralkyl having 6–10 ring carbon atoms in the aryl moiety and 1–4 carbon atoms in the alkyl moiety, aryl having 6–10 ring carbon atoms, substituted aryl having 6–10 ring carbon atoms which is substituted with 1–3 substituents selected from the group consisting of halo, nitro, $C_{1-12}$ alkyl, halo-substituted $C_{1-4}$ alkyl, $C_{1-4}$ alkoxy, and mixtures of such substituents, and aryl having 6–10 ring carbon atoms substituted with the corresponding 5-chloro-3-($R_1$)oxy-1,2,4-thia-imidazol-4-yl-inium chloride radical, and $R_1$ is selected from thhe group consisting of $C_{1-14}$ alkyl, halo-substituted $C_{1-4}$ alkyl, aryl having 6–10 ring carbon atoms, and substituted aryl having 6–10 ring carbon atoms which is substituted with 1–3 substituents selected from the group consisting of halo, $C_{1-12}$ alkyl, nitro, halo-substituted $C_{1-4}$ alkyl, $C_{1-4}$ alkoxy, $C_{1-4}$ alkylmercapto, and mixtures of such substituents.

2. Compound according to claim 1 of the formula $$\left[R\!-\!\!\left(\!\!-\!N^{\oplus}\overset{\overset{Cl}{\underset{|}{C}}\!-\!S}{\underset{Cl^{\ominus}}{\Vert}}\overset{|}{\underset{O-R_1}{C=N}}\!\!\right)\right]_x$$

wherein x is a whole number from 1–2, R is selected from the group consisting of $C_{1-12}$ alkyl, chloro-substituted $C_{1-4}$ alkyl, cycloalkyl having 5–7 carbon atoms, phenyl-substituted $C_{1-4}$ alkyl, phenyl, and phenyl which is substituted with 1–2 substituents selected from the group consisting of chloro, $C_{1-4}$ alkoxy and mixtures of such substituents, when x is 1, whereas R is selected from the group consisting of $C_{1-12}$ alkylene and phenylene, when x is 2, and $R_1$ is selected from the group consisting of chloro-substituted $C_{1-4}$ alkyl, phenyl, and phenyl which is substituted with 1–3 substituents selected from the group consisting of chloro, $C_{1-4}$ alkyl, nitro, $C_{1-4}$ alkoxy, $C_{1-4}$ alkyl mercapto and mixtures of such substituents.

3. Compound according to claim 2 wherein x is 1.

4. Compound according to claim 2 wherein R is $C_{1-6}$ alkylene, $R_1$ is chloro-substituted $C_{1-4}$ alkyl, and x is 2.

References Cited

UNITED STATES PATENTS 3,260,725   7/1966   Schroeder _____ 260—302

NICHOLAS S. RIZZO, Primary Examiner
R. J. GALLAGHER, Assistant Examiner

U.S. Cl. X.R.

71—10; 260—453 AR, 453 AL, 454